United States Patent
Gayrard et al.

(10) Patent No.: US 10,228,928 B2
(45) Date of Patent: Mar. 12, 2019

(54) METHOD FOR ACTIVATING A SERVICE MODE IN AN ELECTRONIC DEVICE AND ASSOCIATED DEVICE

(71) Applicant: THOMSON LICENSING, Issy de Moulineaux (FR)

(72) Inventors: Didier Gayrard, Acigne (FR); Lionel Beaurepaire, Clayes (FR); Herve Michel, Saint-Aubin d'Aubigne (FR)

(73) Assignee: InterDigital CE Patent Holdings (FR)

(*) Notice: Subject to any disclaimer, the term of this patent is extended or adjusted under 35 U.S.C. 154(b) by 83 days.

(21) Appl. No.: 14/105,075

(22) Filed: Dec. 12, 2013

(65) Prior Publication Data

US 2014/0173584 A1    Jun. 19, 2014

(30) Foreign Application Priority Data

Dec. 14, 2012 (FR) .................................. 12 62099

(51) Int. Cl.
*G06F 8/65* (2018.01)
*H04L 29/08* (2006.01)
(Continued)

(52) U.S. Cl.
CPC ............... *G06F 8/65* (2013.01); *G06F 8/71* (2013.01); *H04L 63/062* (2013.01); *H04L 67/34* (2013.01);
(Continued)

(58) Field of Classification Search
CPC . G06F 8/65; G06F 8/71; H04L 63/062; H04L 67/34; H04N 21/26291; H04N 21/4586; H04N 21/42204
(Continued)

(56) References Cited

U.S. PATENT DOCUMENTS 5,715,216 A * 2/1998 Dang ................. G11B 15/6835
369/30.34
6,112,098 A * 8/2000 Flint .................. H04M 1/72511
455/464
(Continued)

FOREIGN PATENT DOCUMENTS

CN 102253851 11/2011
EP 2845386 B1 * 8/2017 ........... H04N 21/442
(Continued)

OTHER PUBLICATIONS

Heo et al., "Design and Implementation of Control Mechanism for Standby Power Reduction", Jan. 2008, IEEE (Year: 2008).*
(Continued)

*Primary Examiner* — Wei Y Zhen
*Assistant Examiner* — Junchun Wu
(74) *Attorney, Agent, or Firm* — Jack Schwartz & Associates, PLLC

(57) ABSTRACT

The invention relates to a method for updating data and/or software embedded in an electronic device comprising a communication interface and being suitable to be controlled remotely by a remote control device, the electronic device comprises a mechanical casing cabinet and being configurable into at least one standby mode, said method being characterized in that it comprises the steps of detecting the presence of the remote control device in the receptacle for a determined period, of configuring the standby mode following the detection of the remote control device and of updating embedded data via the intermediary of the communication interface, the update being carried out according to the presence of the remote control device in the receptacle. The invention also relates to the device implementing the method.

20 Claims, 3 Drawing Sheets

(51) Int. Cl.
*H04N 21/422* (2011.01)
*G06F 8/71* (2018.01)
*H04N 21/262* (2011.01)
*H04N 21/458* (2011.01)
*H04L 29/06* (2006.01)

(52) U.S. Cl.
CPC . *H04N 21/26291* (2013.01); *H04N 21/42204* (2013.01); *H04N 21/4586* (2013.01)

(58) Field of Classification Search
USPC .......................................... 717/170; 348/14
See application file for complete search history.

(56) References Cited

U.S. PATENT DOCUMENTS

| | | | |
|---|---|---|---|
| 6,445,290 B1 | 9/2002 | Fingal et al. | |
| 6,536,034 B1* | 3/2003 | Nassor | G06F 8/66 717/136 |
| 6,618,557 B1* | 9/2003 | Ziemkowski | G03B 17/38 396/301 |
| 6,687,901 B1* | 2/2004 | Imamatsu | G06F 8/65 717/170 |
| 6,879,254 B1* | 4/2005 | Graham | G08B 21/24 340/539.13 |
| 7,523,226 B2 | 4/2009 | Anderson et al. | |
| 8,031,270 B1* | 10/2011 | Wisniewski | G08C 17/02 340/12.25 |
| 8,305,249 B2* | 11/2012 | Reams | H04N 5/4403 341/176 |
| 8,749,427 B2* | 6/2014 | Reams | H04N 5/4403 341/176 |
| 9,032,387 B1* | 5/2015 | Hill | G06F 8/61 717/173 |
| 2001/0029583 A1* | 10/2001 | Palatov | G06Q 30/02 713/193 |
| 2001/0054112 A1* | 12/2001 | Nobakht | G06F 17/30884 709/245 |
| 2002/0070712 A1* | 6/2002 | Arul | G08C 23/04 320/167 |
| 2002/0083428 A1* | 6/2002 | Lee | G06F 8/61 717/170 |
| 2002/0097346 A1* | 7/2002 | Chen | H04N 5/64 348/836 |
| 2005/0077997 A1* | 4/2005 | Landram | H04L 29/06 340/5.54 |
| 2005/0158100 A1* | 7/2005 | Yamaguchi | G06F 8/65 400/62 |
| 2005/0251565 A1 | 11/2005 | Weel | |
| 2005/0251566 A1* | 11/2005 | Weel | G06Q 30/06 709/219 |
| 2005/0251576 A1* | 11/2005 | Weel | H04N 21/4126 709/227 |
| 2007/0123256 A1* | 5/2007 | Whitesell | H04M 1/72505 455/435.1 |
| 2007/0159348 A1* | 7/2007 | Kang | G08C 17/00 340/539.3 |
| 2008/0028395 A1* | 1/2008 | Motta | G06F 8/65 717/177 |
| 2008/0138028 A1* | 6/2008 | Grady | H04N 1/00299 386/291 |
| 2008/0178304 A1* | 7/2008 | Jeansonne | G06F 21/88 726/34 |
| 2008/0186410 A1 | 8/2008 | Hardacker et al. | |
| 2009/0038004 A1* | 2/2009 | Blasko | G06F 21/35 726/20 |
| 2009/0051563 A1* | 2/2009 | Kuo | H02J 7/0044 340/4.61 |
| 2009/0225231 A1* | 9/2009 | Sozeri | G06F 8/65 348/734 |
| 2009/0243872 A1* | 10/2009 | Takahashi | G06F 21/34 340/687 |
| 2010/0013551 A1* | 1/2010 | Reams | H04N 5/4403 327/544 |
| 2010/0017555 A1* | 1/2010 | Chang | G06F 12/0246 711/103 |
| 2010/0029303 A1* | 2/2010 | Lim | H04L 12/1859 455/466 |
| 2010/0029383 A1* | 2/2010 | Dai | G08C 17/02 463/31 |
| 2010/0058425 A1* | 3/2010 | Masimore | H04N 21/235 725/131 |
| 2010/0079106 A1 | 4/2010 | Graham | |
| 2010/0131691 A1* | 5/2010 | Chatterjee | G06F 1/1632 710/303 |
| 2011/0029726 A1* | 2/2011 | Fujimoto | G06F 8/65 711/103 |
| 2011/0054704 A1* | 3/2011 | Karpman | F02C 9/28 700/282 |
| 2011/0150431 A1* | 6/2011 | Klappert | H04N 7/163 386/296 |
| 2011/0179405 A1* | 7/2011 | Dicks | G06F 8/61 717/168 |
| 2011/0187489 A1* | 8/2011 | Lee | G05B 23/02 340/3.1 |
| 2012/0174088 A1* | 7/2012 | Jung | G06F 8/665 717/171 |
| 2013/0125107 A1* | 5/2013 | Bandakka | G06F 11/1417 717/171 |
| 2013/0185761 A1* | 7/2013 | Friel | H04H 60/32 725/139 |
| 2013/0268922 A1* | 10/2013 | Tiwari | G06F 8/67 717/168 |
| 2013/0332917 A1* | 12/2013 | Gaither | G06F 8/656 717/170 |
| 2014/0172128 A1* | 6/2014 | Johnson | E02F 9/205 700/83 |

FOREIGN PATENT DOCUMENTS

| | | |
|---|---|---|
| JP | 2000207969 A * | 7/2000 |
| KR | 20060120342 A * | 11/2006 |
| WO | WO-2012165947 | 12/2012 |

OTHER PUBLICATIONS

Pussep et al., "On Energy-Awareness for Peer-assisted Streaming with Set-Top Boxes", 2010, IEEE (Year: 2010).*
Search Report dated Oct. 14, 2013.

* cited by examiner

METHOD FOR ACTIVATING A SERVICE MODE IN AN ELECTRONIC DEVICE AND ASSOCIATED DEVICE

This application claims the benefit, under 35 U.S.C. § 119 of French Patent Application 1262099, filed Dec. 14, 2012.

1. FIELD OF THE INVENTION

The invention relates to the field of home electronic equipment connected to a remote server and controlled by a remote control.

2. PRIOR ART

Home electronic devices making a large number of functions available to users most often comprise a control unit which executes embedded software.

The development of technologies is such that the shelf-life of electronic devices is increasingly short. It is therefore important for those designing and supplying them that the development time for a device, prior to its large-scale manufacture and distribution, be as short as possible. A manufacturer of electronic devices can thus be more responsive and position a product on the market which is more likely to respond to competition, for a set of defined functions, and thus hope to gain more market share.

These days, numerous devices are connected to a broadband network and can thus exchange data with remote servers. Also, by using suitable protocols, it is possible to receive data which constitute all or part of the software embedded in a device; their reception therefore corresponding to an update of the software.

The option of updating the embedded software, by receiving data which entirely or partially constitutes it, even though the product has already been purchased and is in use, allows the manufacturer to put it on sale and make it available to the user with a degraded version or with a number of functions which may subsequently be increased.

The update procedures are often tedious as they require a significant level of reliability and security, without which the risk of malfunction or failure can be significant.

Unless using a specific configuration, the updates are carried out after notification of availability of a new version to the user and after acceptance of the download of one or more embedded software modules.

Some devices operate in such a way that the update notification/request is made during the day; the download is carried out for example at night. Other devices operate according to statistics on use of the device. Still others only carry out updates of the embedded software in time slots predefined by the user, or even on request of the user and according to demand.

The existing update methods have the disadvantage of often rendering functions of the device concerned unavailable to the user. The level of reliability and security of updates is such that this requires a non-negligible time. This situation sometimes presents significant disruption in the use of the devices.

3. SUMMARY OF THE INVENTION

The invention enables the situation to be improved by using a method for updating data constituting all or part of the embedded software, in one go or by successive downloads of portions of software data, at the instants when this represents the least risk of disruption for the user. The updates are made when the user is not using the electronic device concerned.

More specifically, the invention relates to a method for updating software embedded in an electronic device comprising a communication interface and being suitable to be controlled remotely by a remote control device. The electronic device comprises a mechanical casing in the form of a cabinet and is configurable into at least one standby mode. The mechanical casing cabinet comprises a receptacle for storing the remote control device, the method comprises steps of
- detecting the presence, during a predetermined period, of the remote control device in the receptacle;
- configuring the electronic device into a standby mode following the detection of the remote control device in its receptacle;
- updating embedded software via the communication interface, the update being carried out according to the time of presence of the remote control device in the receptacle.

According to an embodiment of the invention, the step of updating the embedded software is interrupted when the remote control device is absent from the receptacle for a second predetermined period.

According to an embodiment of the invention, the electronic device is configured to exit standby mode when the remote control device is absent from the receptacle for a third predetermined period.

According to an embodiment of the invention, the step of updating the embedded software comprises at least one step of checking the version of the embedded software with respect to a version available on a remote server.

According to an embodiment of the invention, the update of the embedded software is carried out by successive downloads of portions of the embedded software, the successive downloads beginning when the remote control device is present in the receptacle for at least the first predetermined period and ending when the remote control device is absent from the receptacle for a second predetermined period.

The invention also relates to an electronic device comprising a communication interface and being suitable to be controlled remotely by a remote control device, the electronic device comprising a mechanical casing and being configurable into at least one standby mode. The device further comprises:
- a mechanical casing comprising a receptacle for storing (or placing) the remote control device; the receptacle comprises a device for detecting the time of presence of the remote control device in the receptacle;
- a power supply module configurable according to the time of presence of the remote control device in the receptacle;
- a control unit suitable for the update of all or part of an embedded software application via the intermediary of the communication interface, the update being carried out according to the time of presence of the remote control device in the receptacle.

According to an embodiment of the invention, the mechanical casing comprises an upper face and the upper face comprises the receptacle for the remote control device.

According to an embodiment of the invention, the electronic device comprises an actuator element suitable for modifying the position of the remote control device in the receptacle when the update of the embedded software is complete.

According to an embodiment of the invention, the electronic device comprises an accumulator charging module element suitable for charging the remote control device with energy, the charging module being activated when the remote control device is positioned in the receptacle.

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

In FIGS. 1 to 4, the modules shown are functional units that may or may not correspond to physically distinguishable units. For example, these modules or some of them are grouped together in a single component, or constituted of functions of the same software. On the contrary, according to other embodiments, some modules are composed of separate physical entities.

In a general but non-restrictive way, the invention relates to an electronic device equipped with a sensor for detecting the presence of the associated remote control, in a housing suitable for its storage, thus making it possible to define times during which the user does not wish to use the device and which are therefore particularly favourable to configuring the device into a service mode comprising an update of the embedded software.

By "embedded software" is understood all software modules and routines necessary for implementing the functions made available to the user and specified for the use of the electronic device embedding the software in non-volatile memory. However, the embedded software can include, for example, additional applications and data. For example, the embedded software can comprise data corresponding to an item of audiovisual content which will be stored in non-volatile memory, with a view to a subsequent reproduction by the electronic device. Another example is a list of television channels, the channels being associated with reception parameters with a view to their reception and the display of content broadcast on these channels by the electronic device.

Figure 1:
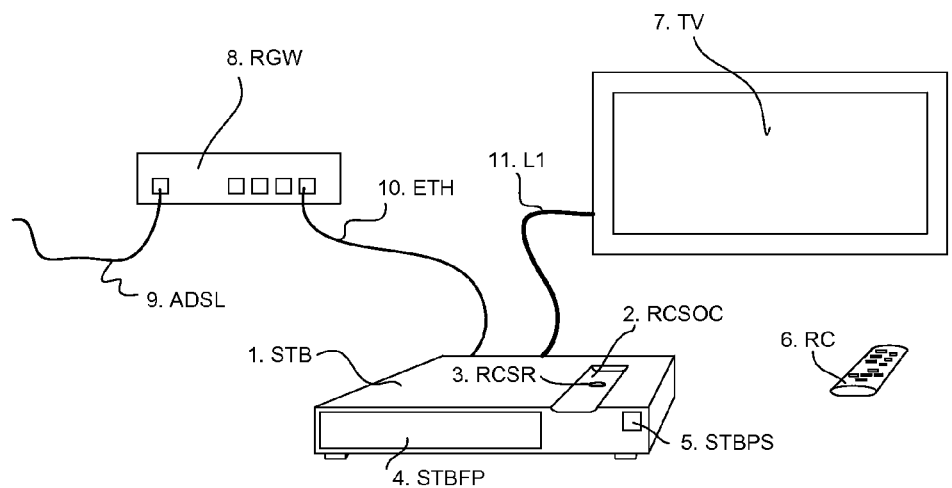
FIG. 1 shows a system for receiving audiovisual programmes from a broadband network, the system comprising a remotely controllable receiver-decoder.

FIG. 1 shows a system for receiving audiovisual programmes comprising an audiovisual content receiver-decoder STB 1. The receiver-decoder STB 1 is connected to an item of equipment of ADSL (Asymmetric Digital Subscriber Line) gateway type RGW 8 via the intermediary of an Ethernet link ETH 10. The item of network gateway equipment RGW 8 is connected to a broadband network by an ADSL link 9. The ADSL link 9 is an ADSL subscriber line connected to an item of equipment of remote DSLAM type present in a node for connecting to a broadband network. The broadband network comprises the Internet. The receiver-decoder device (or equipment) STB 1 comprises means for accessing remote servers also connected to the Internet, and notably content servers (for Web, television or video-on-demand content, for example). The device STB 1 can also access servers dedicated to its maintenance (service) and notably servers making available software modules (or routines) corresponding to various versions of the embedded software of the receiver-decoder STB 1. It is thus possible to reprogramme the device STB 1 with an earlier version of its embedded software, in the event of a problem, or with recent versions offering an increased number of functions. These programmings or reprogrammings are called "updates" of the embedded software. The updates are carried out by downloading software modules from one or more remote service servers. The downloads can be carried out so that all embedded software is downloaded in one go or by successive downloads of portions of the embedded software. The portions can be downloaded during consecutive downloads or during time-spaced downloads. For example, a software module can be downloaded in the morning of a first day of the week and a second part can be downloaded in the afternoon of the same first day, then a third part can be downloaded on a second day of the week. According to another example, the download is carried out on the basis of the same download time daily until full download.

According to the inventive concept, the invention makes it possible to carry out the embedded software download phases (update) at times when this represents less disruption for the user. The internal architecture of electronic devices is sometimes such that the update operations render some elements of the equipment inoperative or limit access to certain functions. The embedded software update remaining an operation requiring great reliability and a good level of security. The level of security being in others associated with notions of software piracy protection.

The receiver-decoder STB 1 is connected to a reproduction device TV 7 via the intermediary of a link L1 11. The link L1 11 is an HDMI cable. According to a variant, the link L1 11 is a SCART/PERITEL connection or a set of baseband composite signal transmission cables (CVBS, RGB, etc.).

The receiver-decoder device STB 1 is remotely controllable by a remote control device RC 6, also commonly called a "remote control".

The receiver-decoder STB 1 comprises a mechanical casing, also commonly called a "cabinet". The mechanical casing comprises a receptacle for storing (or housing) the remote control device RC 6. The receptacle RCSOC 2 comprises a detection device (or sensor) RCSR 3 configured to detect the presence of the remote control device RC 6 in the receptacle (or housing) RCSOC 2. According to an embodiment of the invention, the detector RCSR 3 is a microswitch coupled to a pin, connected to a control input of a power supply module of the electronic device STB 1.

The receiver-decoder device STB 1 also comprises a general switch STBPS 5 for electrically isolating it from the mains power supply network or from the external power supply unit, according to the power supply mode. This makes it possible to have zero electrical consumption.

According to a variant embodiment, the detection device RCSR 3 is an inductive (or self-inductive) detector and the remote control device RC 6 comprises a metallic element placed so that its presence can be detected by the inductive detector. According to a variant, the detection device is an optical cell configured to detect variations in brightness inherent to the presence or absence of the remote control device RC 6 in its receptacle RCSOC 2.

According to another variant, the sensor uses NFC (Near Field Communication) technology to detect the presence of the remote control device in its housing, which housing is comprised in the mechanical casing (cabinet) of the electronic device.

The electronic device STB 1 further comprises a display device STBFP which comprises display elements of LCD type, 7-segment displays and light emitting diodes, associated with pictograms and making it possible to indicate to the user certain specific statuses of the device (normal use mode, standby mode, download in progress, reception of a control frame from the remote control device, for example).

Figure 2:
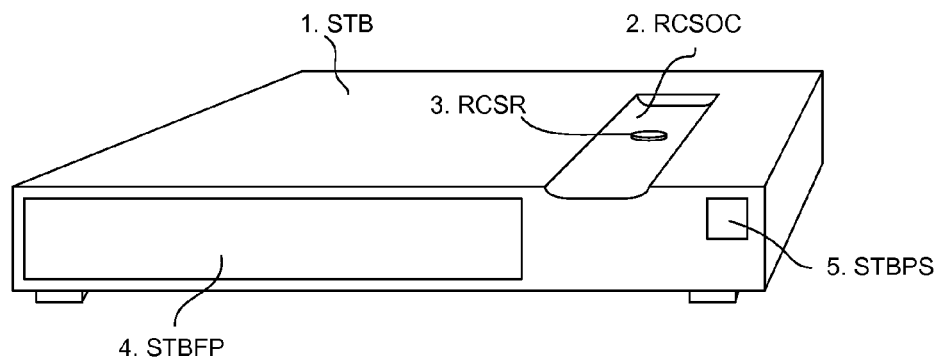
FIG. 2 shows details of the receiver-decoder of the system shown in FIG. 1.

FIG. 2 shows an enlarged view of the receiver-decoder STB 1 of FIG. 1 and notably the receptacle (or housing) RCSOC 2 which comprises the detection device, also called sensor, RCSR 3.

Figure 3:
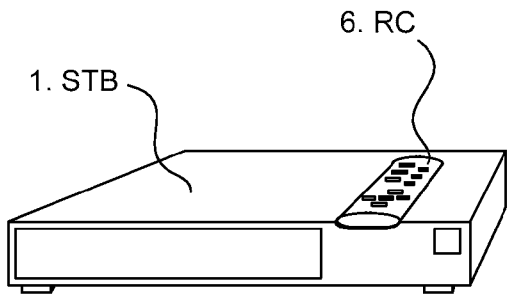
FIG. 3 shows the receiver-decoder shown in FIG. 1 and FIG. 2, with its remote control device.

FIG. 3 shows a view of the receiver-decoder STB 1 when its remote control device RC 6 is positioned (or stored) in its receptacle (or housing) RCSOC 2. When the control device RC 6 is stored in the receptacle of the mechanical casing of the receiver-decoder STB 1, the sensor RCSR 3 is activated and controls an input of the power supply module of the receiver-decoder STB 1 so that the receiver-decoder 1 is configured into standby (or low-consumption) mode. According to an embodiment of the invention, the standby mode configuration of the receiver-decoder is such that at least some of the functions are inhibited or rendered unavailable to the user, ensuring a lower electrical consumption. The receiver-decoder STB 1 nevertheless comprises a control unit which remains at least partially active when it is configured in standby mode, which makes it possible to carry out a certain number of tasks and notably the download, from one or more remote servers, of embedded software modules.

Figure 4:
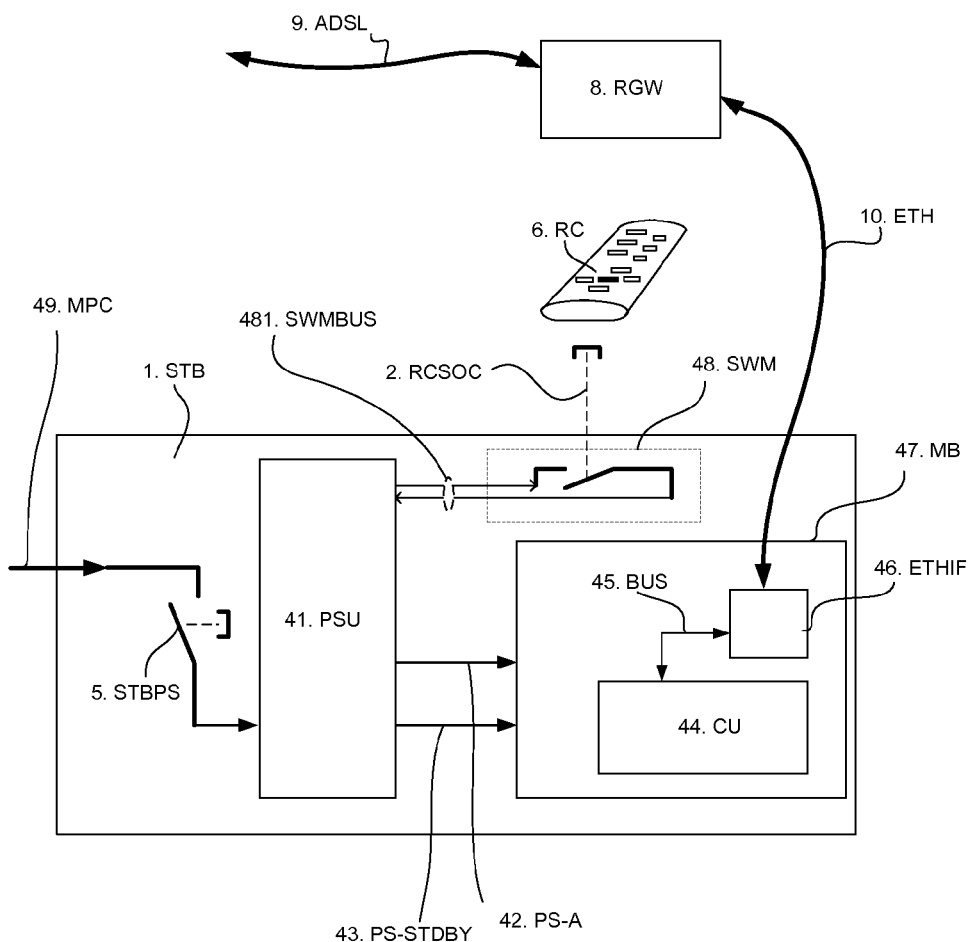
FIG. 4 shows the overall architecture of the receiver-decoder shown in FIGS. 1 to 3.

FIG. 4 shows the internal architecture of the electronic receiver-decoder device 1. The power supply module PSU 41 is supplied with current by the domestic electrical network MPC 49. It can be isolated from the network MPC 49 by the use of a switch STBPS 5. The power supply module delivers power to a motherboard MB 47 over two voltage lines PS-A 42 and PS-STDBY 43. The voltage line PS-A 42 is always active; that is to say that the output voltage VPS-A is always present, both in normal power supply mode, when all the functions are available or available to the user, and in standby power supply mode, when a certain number of functions are invalidated, or rendered inoperative or inaccessible to the user, for the purpose of saving energy. As for the voltage line PS-STDBY 43, it is activated in normal mode and deactivated in standby mode. When the receiver-decoder STB 1 is configured in standby mode, the deactivation of the power supply line PS-STDBY deprives some of the elements of the motherboard MB 47 of power supply. The consumption of the motherboard is in this case reduced. However, in standby mode, a certain number of functions remain active and notably a part of the control unit CU 44, a network communication interface ETHIF 46 and a bi-directional communication bus BUS 45 between the communication interface 46 and the control unit 44. The control unit CU 44 comprises a microcontroller, associated with non-volatile memory for the storage of embedded software routines and modules, and random access memory (also called working memory) for the execution by the microcontroller of the software modules. The control unit further comprises a set of elements typically present in such an architecture, namely one or more clock circuits, a time stamp, input/output ports, interruption lines and peripheral interfaces for communicating with other elements of the motherboard 47. These various elements are not detailed here since this type of architecture is well known to those skilled in the art and as their detail is not necessary for the understanding of the present invention. The power supply configuration modes referred to as "normal" and "standby" are controlled by the detection device RCSR 3 of the remote control receptacle RCSOC 2. The detection device RCSR 3 comprises a microswitch SWM 48 connected to a control input of the power supply module PSU 41.

The communication interface ETHIF 46 is an Ethernet network interface, connected to a port of the gateway device RGW 8 by an Ethernet cable ETH 10. The gateway device RGW 8 is connected to the Internet via the intermediary of an ADSL link 9.

Thus, and according to the preferred embodiment, the positioning of the remote control device RC 6 in its receptacle RCSOC 2 results in the activation of the microswitch SWM 48 of the detection device RCSR 3. The activation of the device controls the power supply module PSU 41 so that the receiver-decoder STB 1 is configured (enters) into standby mode. The power supply line PS-STDBY 43 is deactivated, which renders inoperative some of the functions of the motherboard MB 47 and reduces the power consumption. According to a variant embodiment, the electronic device STB 1 is not configured into standby mode when the remote control device is positioned in its receptacle RCSOC 2, and a service mode comprising update operations is nevertheless executed (in normal mode, as opposed to standby mode). The control unit CU 44, the communication interface ETHIF 46 and the elements useful to their operation remain active. When the control device is detected present for a predetermined time T1 in the receptacle, the control unit CU 44 executes a procedure for updating its embedded software. The control unit then sends a request to a remote service server to obtain a list of embedded software compatible with the receiver-decoder STB 1 and a version identifier for each of the embedded software applications available on the remote server. The request comprises a precise identifier of the receiver-decoder device STB 1, such as, for example, a serial number or any unique number enabling the remote server to establish a correlation with the different software modules which it makes available by download via the Internet network, and therefore via the ADSL link 9, the network gateway RGW 8, the Ethernet link 10 and the network communication interface ETHIF 46. According to a variant embodiment, the ADSL link 9 and Ethernet link ETH 10 are network links using wireless technologies.

The remote server responds to the request and indicates to the receiver-decoder STB 1 a list of embedded software modules available as downloads. The receiver-decoder STB 1 then requests the download of one or more modules by using a predefined protocol with the remote server. This protocol is not detailed here, not being useful to the understanding of the invention. When a service operation such as the download of one or more embedded software modules is in progress and the control device RC 6 is detected absent from its receptacle RCSOC 2 for at least one predetermined period T2, the download of the software module in progress is interrupted and a list of the modules already downloaded is written to the non-volatile memory of the control unit CU 44. Advantageously, this method of activating downloads in a service phase, and of interrupting the download according to the presence of the remote control device RC 6 in the receptacle RCSOC 2 makes it possible to carry out updates at times when this least disrupts the user of the electronic receiver-decoder device STB 1. In fact, when the user takes care to position (store) the remote control device RC 6 in its receptacle comprised in the mechanical casing (or cabinet) of the receiver-decoder device STB 1, it is because he plans on not using it for a certain time, notably because he is familiar with the download method implemented in the system. If the update is interrupted by the user picking up the remote control device RC 6 again from its receptacle, the update will be continued during the next positioning in the receptacle. An update can thus be carried out by a succession of downloads until the embedded software version to be downloaded its completely downloaded. The user is then notified that the download of a version is complete. The notification can be carried out by the display of a message on the display device STBFP 4 of the receiver-decoder STB 1.

According to a variant embodiment of the invention, the notification of end of download is carried out by the activation of an actuator of reduced size such as an electromechanical system, for example, which makes it possible to modify the position of the remote control device RC 6 in its receptacle RCSOC 2 by lifting it by several millimeters, for example, which thus corresponds to a visual indication inviting the user to pick it up again whenever he wants.

According to a variant, the remote control device RC 6 can be kept positioned (locked) in its receptacle until a critical service operation in progress in the receiver-decoder is completed (a restart, for example, or an installation procedure).

According to a preferred embodiment of the invention, when a user removes the remote control device RC 6 from its receptacle RCSOC 2, the power supply module PSU 41 is configured into normal power supply mode (by exiting standby mode) and all functions of the receiver-decoder STB 1 are rendered available to the user. Advantageously, this makes it possible to access quickly the different functions implemented by the receiver-decoder STB 1, such as viewing audiovisual programmes, downloading audiovisual content with a view to subsequent playback, or recording broadcast content.

Advantageously, the updates can be rendered invisible to the user if the end of the updates is not notified visually to the user. When the end is notified visually to the user the update is not invisible, but is nevertheless done so that it does not cause disruption or constraint for the user. In fact, the user is not required to accept or refuse an update or to wait for the end of an update before being able to resume normal use of the receiver-decoder STB 1 (a use separate from any service or update operation).

According to the preferred embodiment of the invention, the updates are carried out by software module download. Each software module is downloaded into a non-volatile buffer memory, such as a flash memory, for example. The replacement by overwriting data in the main non-volatile memory only takes place when all embedded software modules necessary for the update have been properly downloaded. A check on the integrity of the data is made in order to ensure that it will be possible for the embedded software recently downloaded to be properly executed without the risk of rendering the electronic receiver-decoder device STB 1 permanently unresponsive.

Figure 5:
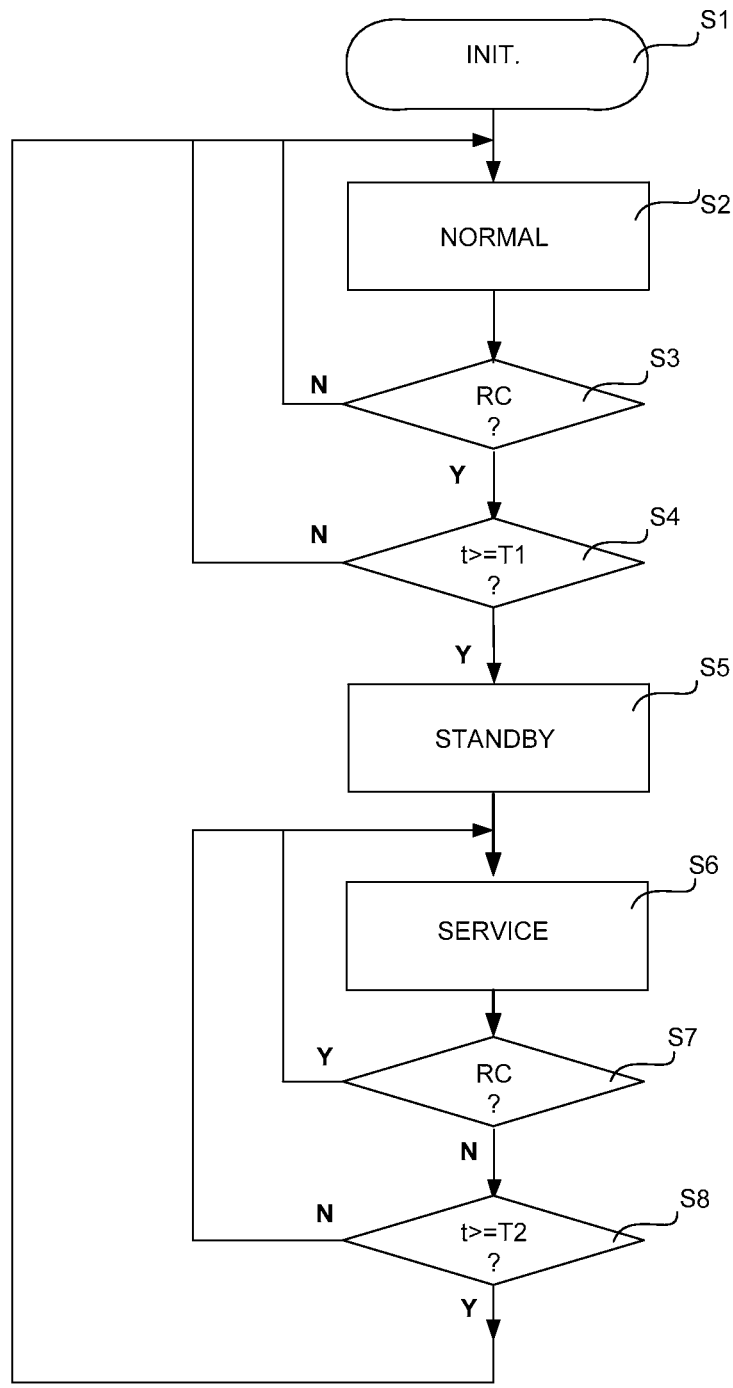
FIG. 5 is a diagram showing the method for updating the embedded software of the receiver-decoder shown in the preceding figures.

FIG. 5 is a functional diagram showing the method according to the preferred embodiment of the invention. Step S1 corresponds to an initialisation phase making it possible to achieve normal use of the receiver-decoder STB 1. The initialisation phase comprises the start-up and the full configuration of the receiver-decoder STB 1 with a view to being able to access the functions made available to the user.

Step S2 is the normal configuration mode, outside standby mode, during which the user can use all functions of the receiver-decoder STB 1, that is to say receiving and viewing audiovisual content, as well as recording it.

Step S3 corresponds to a scan using the detection device RCSR 3 of the receptacle RCSOC 2. When the presence of the remote control device RC 6 is detected, a time counter is started and a comparison of the value of the time counter with a predetermined value T1 is carried out in step S4. When the time counter does not exceed the value T1, normal mode is retained by returning to step S2 then to step S3 where the time counter previously started is incremented. When the remote control device is present in the receptacle RCSOC 2 for a period at least equal to T1, the time counter is reset to zero and the electronic receiver-decoder device STB 1 is configured into standby mode in step S5. A request aiming to define whether an update must take place is then sent, in step S6, to the remote service server, connected to the broadband network, such as the Internet for example. If so, the download of one or more embedded software modules takes place between the remote server and the receiver-decoder STB 1. While the download is in progress, the method carries out a scan of the detection device, identical to the scan of steps S3 and S4 in principle, but aiming this time to detect the absence of the remote control device for a predetermined period T2. This detection is carried out by looping round steps S7 and S8. If the remote control device is detected absent from its receptacle for a period at least equal to T2, then the update is interrupted and the method carries out a return to normal mode of the receiver-decoder STB 1. A list of software modules already downloaded is saved in non-volatile memory and the update will be resumed, if necessary, during the next positioning of the remote control device RC 6 in its receptacle RCSOC 2.

According to a variant embodiment of the invention, the predetermined period T1 is zero, which results in the configuration of the receiver-decoder STB 1 into service mode as soon as the remote control is positioned in its housing.

According to another variant embodiment of the invention, the predetermined period T2 is zero, which results in the configuration of the receiver-decoder STB 1 into normal mode as soon as the remote control is removed from its housing.

In other words, the receiver-decoder STB 1 is configured to implement a method for updating its embedded software. In order to do this, it comprises a communication interface ETHIF. It can be controlled remotely by its remote control device RC. It comprises a mechanical casing, its cabinet, and is configurable into at least one standby mode. The casing comprises a receptacle for storing the remote control device RC 6 (remote control). The implementation method comprises the steps of:

detecting the presence, during a predetermined period, of the remote control device RC in the receptacle RCSOC comprised in the cabinet of the receiver-decoder;

configuring the standby mode following the detection of the remote control device in the receptacle;

updating at least one embedded software module via the communication interface, from a remote server connected to the Internet, the update being carried out according to the time of presence of the remote control device RC in the receptacle RCSOC.

According to the method, the step of updating the embedded software is interrupted when the remote control device RC is absent from the receptacle RCSOC for a predetermined period, which can, according to variants, be zero or non-zero.

According to the method, the receiver-decoder STB 1 is further configured to exit standby mode when the remote control device RC is removed (absent) from its receptacle RCSOC for a third predetermined period which, according to variants, can be zero or non-zero.

The step of updating the embedded software comprises at least one step of checking the version of the embedded software with respect to a version available on a remote service server.

According to the method, the update of the embedded software in the receiver-decoder STB 1 is carried out by successive downloads of portions of its embedded software, the successive downloads beginning when the remote control device RC is present in the receptacle RCSOC for at least a first predetermined period and ending when the remote control device RC is removed (absent) from the receptacle RCSOC for a second predetermined period.

The receiver-decoder STB 1 is therefore an electronic device comprising a communication interface ETHIF and which is suitable to be controlled remotely by its remote control device RC; it comprises a mechanical casing (its cabinet) and is configurable into standby mode.

Its mechanical casing comprises the receptacle RCSOC for housing its remote control device RC.

The receptacle housing comprises a detection device RCSR which is configured to measure the time of presence of the remote control device RC in its receptacle RCSOC.

The power supply module PSU is configurable according to the measured time of presence of the remote control device RC in its receptacle RCSOC.

The control unit CU of the receiver-decoder STB 1 is suitable for the update of its embedded software via the communication interface ETHIF. The updates are carried out according to the measured time of presence of the remote control device RC in its receptacle housing RCSOC.

According to the preferred embodiment of the invention, the mechanical casing cabinet of the receiver-decoder STB 1 comprises an upper face and this upper face comprises the receptacle housing for housing (storing) the remote control device.

According to variant embodiments, the housing RCSOC can be comprised in the left side face, in the right side face or in the front face of the mechanical casing cabinet of the receiver-decoder STB 1, insofar as these faces exist due to the shape of the cabinet.

According to an embodiment of the invention, the receiver-decoder STB 1 comprises an actuator element suitable for modifying the position of the remote control device RC in its receptacle housing RCSOC when an update of the embedded software of the control unit is complete. Advantageously, this enables a visual notification to the user, in the form of an invitation to take its remote control, the receiver-decoder STB 1 being "updated".

According to the preferred embodiment of the invention, the receiver-decoder STB 1 further comprises an accumulator charging module element suitable for charging the remote control device with energy, which remote control device comprises an energy accumulator element. The receptacle housing RCSOC comprises electrical connection elements for charging the accumulator and the charging module is activated when the remote control device RC is positioned in the receptacle RCSOC.

Advantageously, the presence of a charging module makes it possible to avoid a physical presence sensor (detector) and to detect the presence of the remote control device by measuring a current at the electrical connection elements.

Another advantage directly linked to the presence of an accumulator charger for the remote control device is that this encourages the user to store (and therefore position) the remote control device in its receptacle housing more frequently, in order to ensure a proper charging of the energy accumulator internal to the remote control device. This consequently facilitates the definition of preferred times for configuring the receiver-decoder device STB 1 into service mode, including any embedded software updates.

The invention is not restricted to the embodiments described above but also applies to any electronic device remotely controllable by a remote control device (remote control), it being possible for the remote control device to be housed in a receptacle comprised in the electronic device, the electronic device being liable to update its embedded software from a remote server.

The embodiments detailed above describe the invention in an item of equipment of ADSL digital television receiver-decoder type. However, the invention does not apply solely to this type of equipment but to any device comprising a control unit whose embedded software can be updated and comprising a housing (receptacle) for housing a remote control, the housing comprising a presence detector for the remote control.

The invention also applies, for example, to a desktop computer, a laptop computer, a tablet, a television set, a hi-fi system or a gateway for accessing a broadband communication network.

Moreover, the invention is not only restricted to an electronic device connected to a remote server via the intermediary of a broadband network but also relates to any device having a download connection not via a broadband network but via another type of network, such as, for example, a terrestrial digital television broadcast network, a radio broadcast network or a satellite broadcast network.

The invention claimed is:

1. An electronic device comprising:
   a mechanical cabinet, said mechanical cabinet comprising a receptacle able to receive a remote control device, the electronic device being suitable to be controlled remotely by said remote control device, said receptacle comprising a device for detecting a presence of said remote control device in said receptacle; and
   a control unit suitable for updating, via a communication interface of said electronic device, data embedded in said electronic device, said updating comprising:
   configuring the electronic device into a standby mode upon detecting a presence of the remote control device within the receptacle of the electronic device;
   initiating a first timer upon detecting the presence of the remote control device within the receptacle of the electronic device;
   transmitting in said standby mode, via said communication interface, a request for updating at least one embedded software module to a remote server; and
   updating the at least one embedded software module via said communication interface after the electronic device is placed in said standby mode, said updating of the at least one embedded software module being delayed until the first timer reaches a first value.

2. The electronic device according to claim 1, wherein said mechanical cabinet comprises an upper face and said upper face comprises said receptacle.

3. The electronic device according to claim 1, wherein said electronic device comprises an actuator element suitable for modifying a position of said remote control device in said receptacle when the update of said embedded data is complete.

4. The electronic device according to claim 1, wherein said electronic device comprises an accumulator charging module element suitable for charging said remote control device, said accumulator charging module being activated when said remote control device is positioned in said receptacle.

5. The electronic device of claim 1 wherein said updating comprises at least checking a version of said embedded data with respect to a version available on a remote server.

6. The electronic device of claim 1 wherein said updating comprises successive downloads of portions of said data.

7. The electronic device of claim 6 wherein said updating comprises a replacement of embedded data when all said portions of data have been properly downloaded.

8. The electronic device of claim 6 wherein said updating comprises, when a critical service operation is in progress in said electronic device, a locking of said remote control device in said receptacle until said critical service operation is completed.

9. The electronic device of claim 1, wherein said updating comprises:
   initiating a second timer upon detecting the remote control device has been removed from the receptacle and interrupting updating of the at least one software module when the second timer reaches a second value.

10. The electronic device of claim 1, wherein said updating comprises:
   initiating a third timer upon detecting the absence of the remote control device within the receptacle and wherein said electronic device is configured to exit said standby mode when the third timer reaches a third value.

11. A method for updating data embedded in an electronic device, comprising:
   configuring the electronic device into a standby mode upon detecting a presence of a remote control device within a receptacle of a mechanical cabinet of the electronic device by a device for detecting the presence of said remote control device in said receptacle;
   initiating a first timer upon detecting the presence of the remote control device within the receptacle of the mechanical cabinet of the electronic device by the device for detecting the presence of said remote control device in said receptacle;
   transmitting in said standby mode, via a communication interface of the electronic device, a request for updating at least one embedded software module to a remote server; and
   updating the at least one embedded software module via the communication interface after the electronic device is placed in said standby mode, said updating of the at least one embedded software module being delayed until the first timer reaches a first value.

12. The method according to claim 11, wherein said updating comprises initiating a third timer upon detecting the absence of the remote control device within the receptacle and configuring said electronic device to exit said standby mode when the third timer reaches a third value.

13. The method according to claim 11, wherein updating embedded data comprises at least checking a version of said embedded data with respect to a version available on a remote server.

14. The method according to claim 11, wherein said updating of the embedded data comprises successive downloads of portions of said data.

15. The method according to claim 14, wherein said updating of embedded data comprises a replacement of embedded data when all said portions of data have been properly downloaded.

16. The method of claim 11, wherein said updating comprises:
   interrupting updating of the at least one software module upon detection the remote control device is removed from the receptacle.

17. The method of claim 11, wherein said updating comprises:
   initiating a second timer upon detecting the remote control device has been removed from the receptacle and interrupting updating of the at least one software module when the second timer reaches a second value.

18. The method of claim 17, wherein the second value is zero.

19. The method of claim 11, wherein the first value is zero.

20. The method according to claim 11, wherein said updating comprises, when a critical service operation is in progress in said electronic device, a locking of said remote control device in said receptacle until said critical service operation is completed.

* * * * *